United States Patent [19]

New

[11] Patent Number: 4,652,150
[45] Date of Patent: Mar. 24, 1987

[54] BEARINGS

[75] Inventor: Nigel H. New, Harrow, England

[73] Assignee: AE PLC, Rugby, England

[21] Appl. No.: 794,550

[22] Filed: Nov. 4, 1985

[30] Foreign Application Priority Data

Dec. 10, 1984 [GB] United Kingdom ............... 8431132

[51] Int. Cl.⁴ .......................................... F16C 27/02
[52] U.S. Cl. .................................................. 384/275
[58] Field of Search ............... 384/275, 294, 288, 428, 384/430, 457

[56] References Cited

U.S. PATENT DOCUMENTS 3,249,391 5/1966 Detlart et al. ..................... 384/294
3,361,502 1/1968 Weinkamer et al. ............... 384/294
3,891,287 6/1975 Vogt ..................................... 384/288

Primary Examiner—Lenard A. Footland
Attorney, Agent, or Firm—William R. Hinds

[57] ABSTRACT

Flanged bearings are described which are amenable to reliable installation by robotics and which do not require such fine engineering manufacturing tolerances on the flanges as has hitherto been the case. A flanged bearing comprises a journal bearing element and at least one thrust bearing element constituting a flange and wherein the thrust bearing element is attached to the journal bearing element by flexible attachment means. Flanged bearings are described wherein flexible attachment portions are formed from the steel backing material of a thrust bearing, slots are also provided to enhance flexibility. The thrust bearing is attached to a journal half bearing by, for example, electron beam welds.

14 Claims, 8 Drawing Figures

BEARINGS

BACKGROUND TO THE INVENTION

The present invention relates to plain bearings and in particular but not exclusively to main bearings and thrust bearings.

Combined plain journal bearings and thrust bearings in the form of flanges and being of unitary construction are well known. They are, however, expensive to produce owing to the very tight tolerances required in their manufacture. In flanged main bearing form very fine tolerances are also required on the housing into which the bearing is to fit. The dimension between the inner opposing faces of the thrust bearings must be held to particularly close tolerances since if too much axial flexure of the thrust bearing occurs fatigue may result with possibly disastrous results.

Generally, such bearings are formed from a single piece of flat strip by appropriate machinery. Attempts have been made to make bearings by a more economical route by, for example, welding the thrust bearing to the journal bearing end faces. Whilst this route may be somewhat cheaper, the same limitation as to tolerances still applies.

Because of the above problems, engine manufacturers have wherever possible tried to use conventional plain journal bearings and separate thrust washers. Running tolerance on crankshaft end float is easily maintained in this case by controlling the wall thickness of the thrust washer.

In recent years engine manufacturers have been placing increased emphasis on the use of robotics in engine assembly. Whilst many assembly operations are amenable to robotics, the installation of separate journal bearings and thrust washers is particularly troublesome. The thrust washers are prone to drop out of the housing before the crankshaft is fitted or they can be fitted back to front. Some of these problems may not come to light until serious damage to the engine has occurred.

In UKP No. 1,297,559 Hill et al describes a flanged half-bearing wherein the flanges are produced separately from the half-bearing but which are attached thereto by means of co-operating slots and lugs. However, even this method of retaining the flanges is not altogether suitable for robotic assembly since the flanges are easily dislodged from the journal bearing during handling.

Evidently the solution to the robotics problem is to have the journal bearing and thrust bearing as a single unit instead of in separate pieces. However, with conventional flanged bearings the expense problem still remains.

OBJECT OF THE INVENTION

It is, therefore, an object of the present invention to provide a bearing unit having combined journal and thrust bearing elements and which is amenable to easy installation by robotics and also does not require such tight tolerances as are needed with conventional flanged bearings. A further object of the present invention is to provide a method of manufacturing such bearings more economically than hitherto and a still further object is to enable the utilisation of substantially standard journal and thrust bearing elements in the construction of such a bearing.

SUMMARY OF THE INVENTION

According to the present invention a flanged bearing comprises a journal bearing element and at least one thrust bearing element constituting a flange and wherein the thrust bearing element is attached to the journal bearing element by flexible attachment means.

In one preferred embodiment the bearing has a flange attached to each end face of the journal bearing. The flexible attachment means may comprise thin attachment tags formed on to or from a thrust bearing or washer and whereby the thrust washer is attached to the journal bearing end face by any appropriate joining technique known in the art such as, for example, resistance, projection, stud, electron-beam, laser or plasma welding.

Alternatively, the thrust washer may be, for example, resistance spot welded to a thin metal backing plate having integrally formed attachment tags.

It is important that the attachment tags are flexible as this removes the necessity for the bearing to be constructed to very tight tolerances. Once the bearing has been installed the resistance of the thrust washer to axial movement by forces imposed by the crankshaft is easily overcome due to the inherent flexibility of the attachment tags. Furthermore, once the engine has been assembled it is of no consequence if the flexible attachment means fracture or otherwise become detached from the journal bearing as the conventional methods of locating and retaining separate thrust washers may also be employed with the present invention. These methods may include, for example, tongues in slots or location by the opposing half-bearing cap to prevent rotation.

Further benefits of the present invention include freedom of choice of lining materials between journal bearing and thrust washer and no thickness limitations on the respective materials employed as is the case when a flanged bearing is produced from a single piece of bi-metal strip where the initial backing and lining material thicknesses generally have to be equal for both the journal and thrust bearing components.

BRIEF DESCRIPTION OF THE DRAWINGS

In order that the invention may be more fully understood, embodiments will now be described by way of example only with reference to the accompanying drawings, of which.

DETAILED DESCRIPTION OF THE PREFERRED EMBODIMENTS

Figure 1:
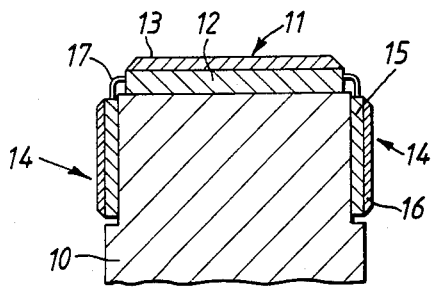
FIG. 1 shows a radial section through a housing having a bearing according to the invention.

Referring now to the figures and where the same or similar features are denoted by common reference numerals.

Figure 2:
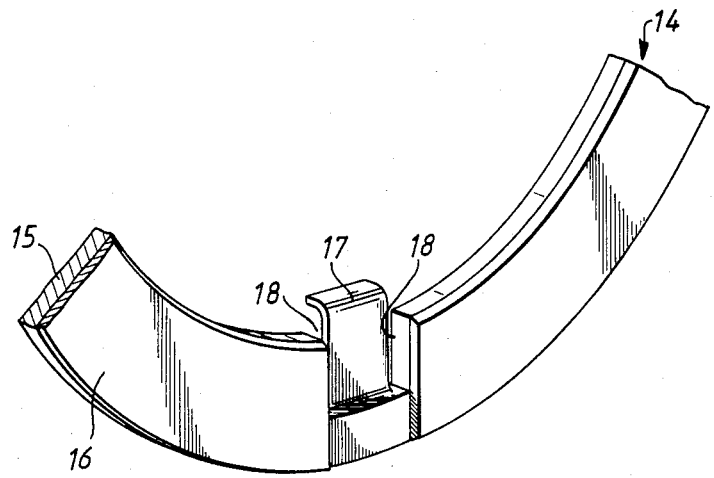
FIG. 2 shows a perspective view of the attachment tag region of the thrust washer element of FIG. 1.

FIGS. 1 and 2 in which bearing housing 10 has a half-bearing 11 fitted in it, the bearing 11 comprising a steel backing 12 and a lining material 13. Attached to the bearing 11 are thrust washers 14 which also comprise a steel backing 15 and lining material 16. The thrust washers 14 are attached to the half-bearing 11 by a lipped attachment tag 17. The attachment tag 17 is formed from the steel backing 15 of the thrust washer 14 which is joined to the half-bearing 11 by electron-beam welding of the lipped portion of the tag 17 to the steel backing 12. The tag 17 is formed by removal of part of the steel backing 15 to leave a thin reduced section which is flexible. The ease of relative movement of the thrust washer 14 with respect to the bearing 11 is enhanced by slots 18 cut either side of the tag 17.

Figure 3:
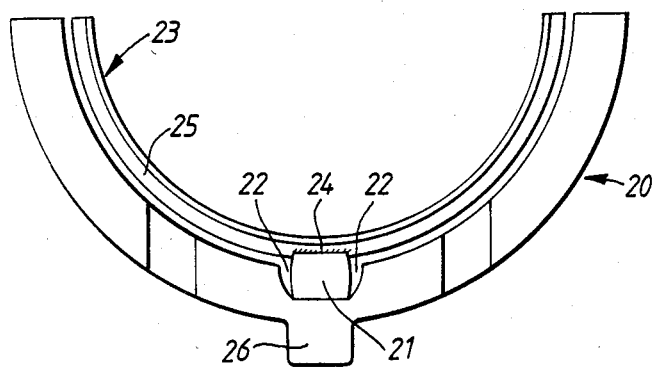
FIG. 3 shows an axial end view of a bearing according to the invention.
Figure 4:
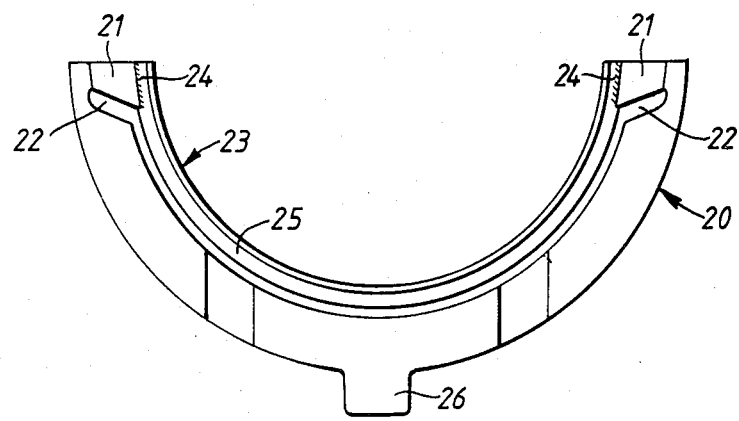
FIG. 4 shows an axial end view of an alternative bearing according to the invention.

FIGS. 3 and 4 show two alternative methods whereby standard thrust washers may be modified to produce bearing assemblies according to the invention. Thrust washers 20 are machined to remove lining material from the area in which it is intended to form the attachment tag(s) 21. Portions of the steel 22 are removed to define the tag shape. The steel is then pressed in order to thin-out and extend it, the lip being formed simultaneously. The thrust washer 20 is attached to a half-bearing 23 by an electron-beam weld 24 between the tag 21 and the steel backing 25 of the bearing 23. In use, fracture of the tag 21 or weld 24 is of no consequence since the thrust washer is prevented from rotating in its housing by a conventional location tongue 26 which co-operates in known manner with a rebate or groove in the bearing housing (not shown).

Figure 5:
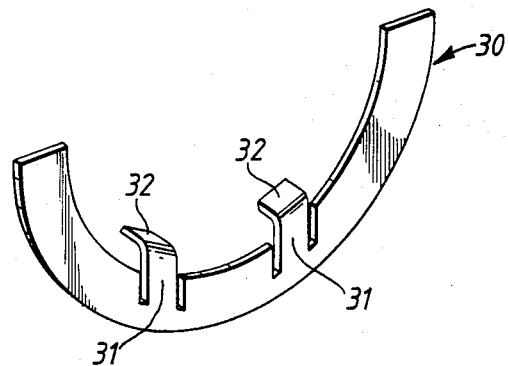
FIG. 5 shows a backing plate having attachment tags.
Figure 6:
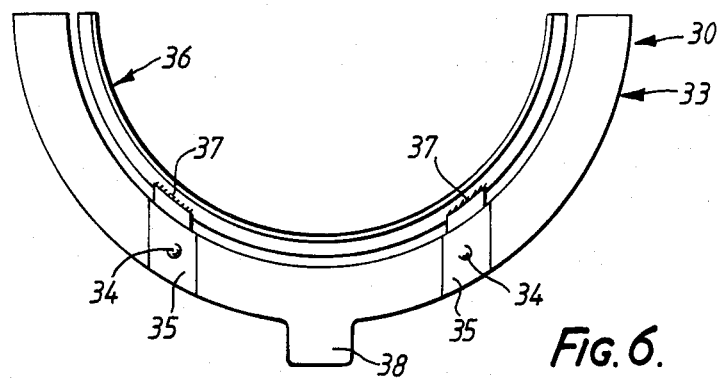
FIG. 6 shows an axial end view of a bearing utilising the backing plate of FIG. 5.

FIG. 5 shows a backing plate 30 stamped from 0.1 mm mild steel. Attachment tags 31 having lipped portions 32 are formed in the same stamping operation. In FIG. 6 the backing plate 30 is indicated behind a thrust washer 33, the backing plate being joined to same by two spot welds 34 in the oil grooves 35. The backing plate 30 and thrust washer 33 assembly is joined to a half-bearing 36 by electron-beam welds 37 of the lipped portions 32 of the attachment tags 31 to the steel backing of the half-bearing 36. Rotational location of the thrust washers is ultimately prevented by a tongue 38.

Figure 7:
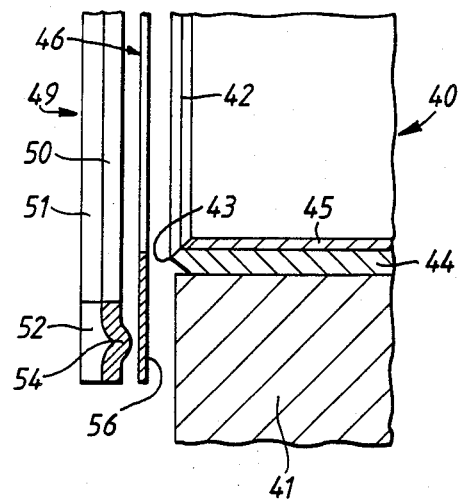
FIG. 7 shows a radial section through the component parts of a bearing according to the present invention prior to assembly.
Figure 8:
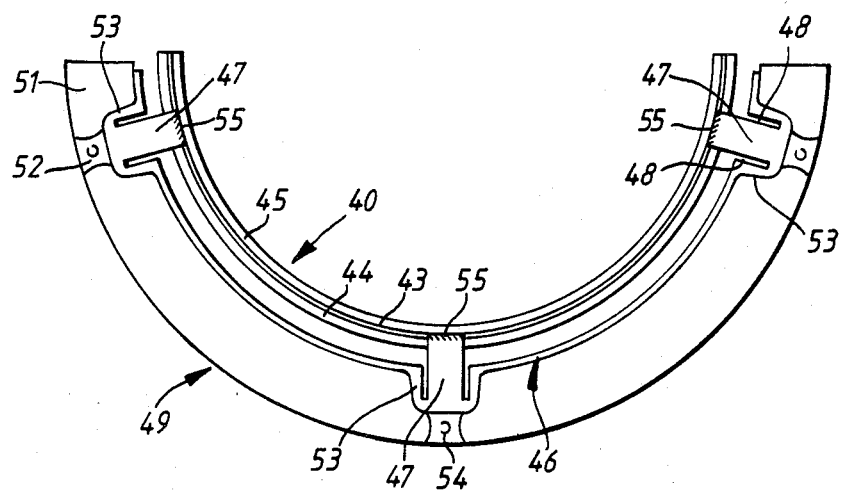
FIG. 8 shows an axial end view of the assembled bearing shown in FIG. 7.

An alternative embodiment employing a backing plate is shown in FIGS. 7 and 8. A half-bearing 40 of slightly greater axial length than its co-operating housing 41 is formed with its two ends faces 42 (only one shown) defining a sharply tapered projection 43. Due to the steel 44 thickness being substantially greater than the lining thickness 45 the nose of the projection 43 is formed exclusively of steel 44. A shim spring steel thrust washer backing piece 46 of about 0.1 mm thickness is formed with three flat, unlipped, flexible tags 47. The steel on either side of the tags 47 is cut away to form slots 48 providing increased flexibility. A thrust washer is shown at 49. The thrust washer 49 is formed of a steel backing 50 and alloy 51. Alloy 51 is removed to leave bare steel in the regions 52 of the thrust washer which correspond to the radial spacing of the tags 47 of the backing piece 46. Furthermore, the thrust washer 49 is also relieved in width in the regions corresponding to the tags 47. Portions of material are removed to leave recesses 53 allowing unhindered flexibility in the tags 47 and slots 48. In the bare steel regions 52 of the thrust washer indentations are made to produce pips 54 facing the backing piece 46. To assemble the bearing the thrust washer 49 is first projection welded by the pips 54 to the backing piece 46. The welded thrust washer and backing piece unit is then projection welded by the nose 43 formed by the bearing end face 42 to the ends 55 of the tags 47. Because of the nature of the projection welding process the tags 47 tend to sink slightly into the nose 43 thereby bringing the back face 56 of the backing piece into closer proximity to the housing 41.

In another alternative embodiment, thin individual attachment tags either flat or having lipped portions may be, for example, spot welded into the thrust washer oil drain-grooves. Evidently, it is necessary that the tag material be sufficiently thin to lie below the bearing material surface. Such individual tags may also be incorporated into grooves machined in the thrust washer backing material.

I claim:

1. A flanged bearing comprising a journal bearing element and at least one thrust bearing element constituting a flange and wherein said thrust bearing element is attached to said journal bearing element by flexible attachment means extending over a relatively small portion of the bearing periphery.

2. A flanged bearing according to claim 1 and wherein there are two thrust bearing elements disposed one at each end of the journal bearing element.

3. A flanged bearing according to claim 1 and wherein said journal bearing and said thrust bearing elements are half-bearings.

4. A flanged bearing according to claim 1 and wherein said flexible attachment means are formed from said thrust bearing element backing material.

5. A flanged bearing according to claim 4 wherein said flexible attachment means comprise thin steel tags.

6. A flanged bearing according to claim 4 and wherein said attachment means are formed from said thrust bearing element backing material and are associated with slots on at least one side of said attachment means such that flexibility of said attachment means is enhanced.

7. A flanged bearing according to claim 1 and wherein said attachment means comprise flexible metal tags extending from the areas of grooves in a face of said thrust bearing element.

8. A flanged bearing comprising a journal bearing element and at least one thrust bearing element constituting a flange and wherein said thrust bearing element is attached to said journal bearing element by flexible attachment means, and wherein said flexible attachment means comprise thin steel tags.

9. A flanged bearing according to claim 8 and wherein said flexible attachment means comprise thin steel tags having a lipped portion adjacent said journal bearing element.

10. A flanged bearing comprising a journal bearing element and at least one thrust bearing element constituting a flange and wherein said thrust bearing element is attached to said journal bearing element by flexible attachment means, and wherein said thrust bearing element is affixed to a mounting plate incorporating said flexible attachment means.

11. A flanged bearing according to claim 1 wherein said flexible attachment means are peripherally spaced from each other.

12. A flanged bearing according to claim 1 wherein said thrust bearing element comprises a bearing lining on a steel backing, and said flexible attachment means extend from said steel backing and are thinner and more flexible than said steel backing.

13. A flanged bearing according to claim 12 wherein said flexible attachment means are formed from said steel backing as peripherally spaced, inwardly projecting, thin steel tags and are welded at their inner ends to said journal bearing element.

14. A flanged bearing according to claim 1 wherein said thrust bearing element and said journal bearing element each comprise a bearing lining on a steel backing, and said flexible attachment means are thinner and more flexible than said steel backing of either of said elements.

* * * * *